Oct. 22, 1963
W. J. BRISCOE ETAL
3,107,799
COMBINATION BACK HOE AND SHOVEL
Filed May 18, 1962
2 Sheets-Sheet 1
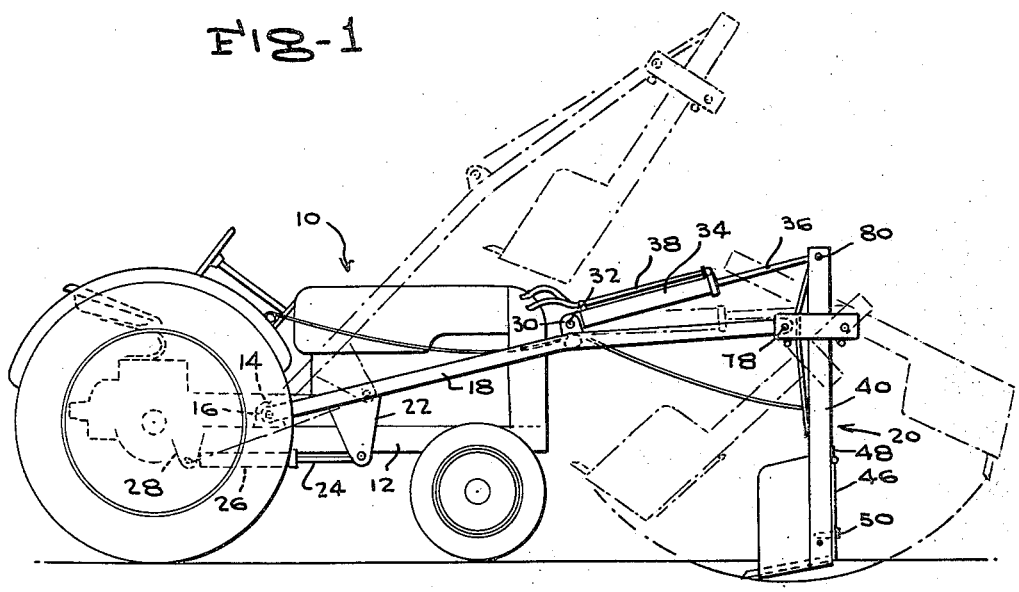
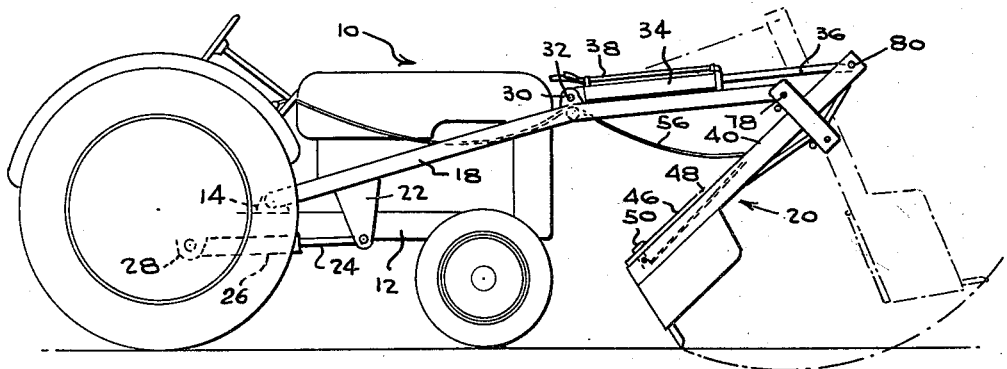
INVENTORS
WILLIAM J. BRISCOE, &
CLARENCE R. BEACH
BY
McMorrow, Berman & Davidson
ATTORNEYS

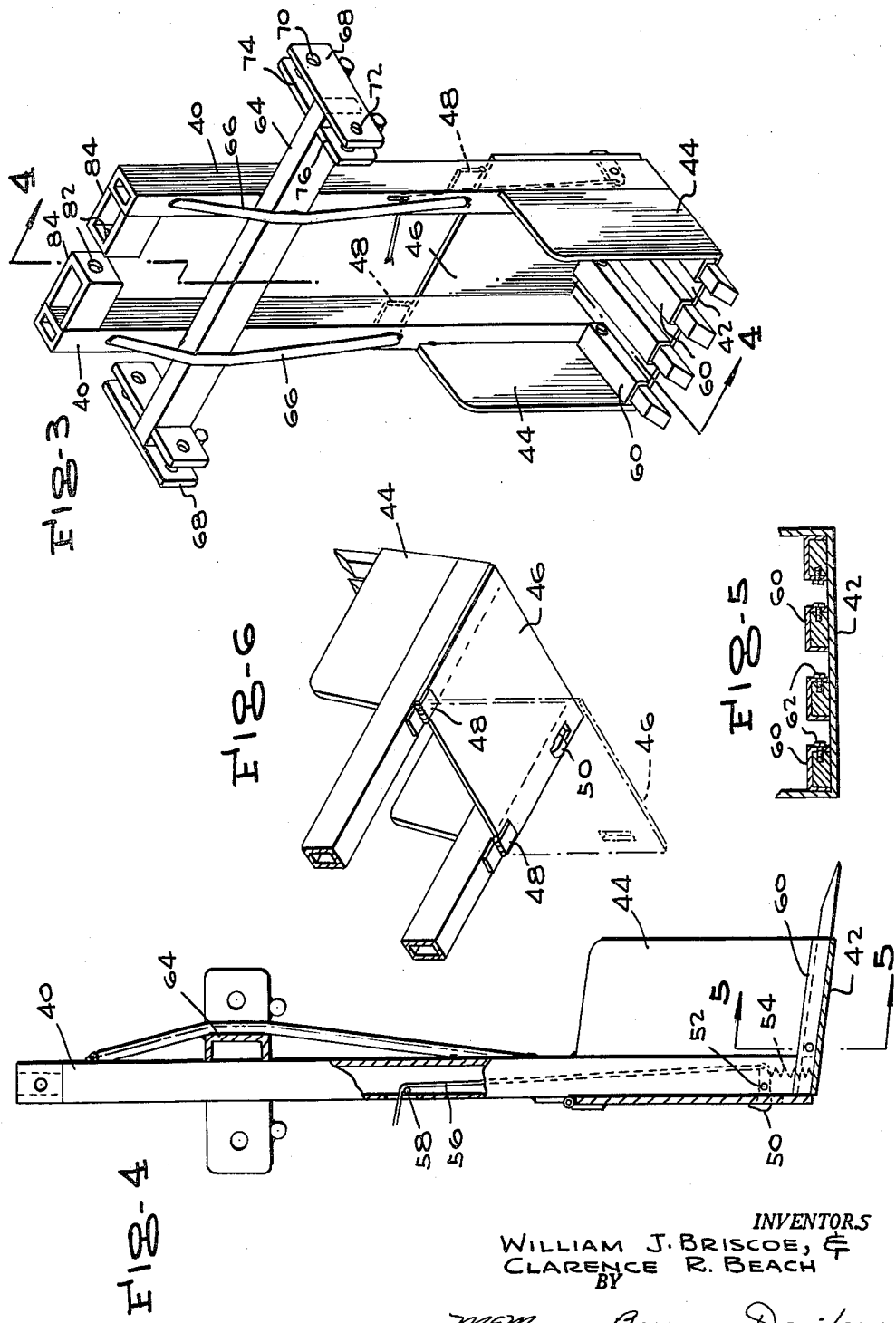

United States Patent Office 3,107,799
Patented Oct. 22, 1963

3,107,799
COMBINATION BACK HOE AND SHOVEL
William J. Briscoe and Clarence R. Beach,
Cedaredge, Colo.
Filed May 18, 1962, Ser. No. 195,782
6 Claims. (Cl. 214—145)

This invention relates to earth working implements, and in particular to a combination bucket and hoe device adapted for alternative mounting on a work tractor.

It is a general object of the invention to provide a single implement which is adapted for easy mounting on a tractor, and which is easily reversible to provide forward scooping or rearward scooping, alternatively.

Another object is to accomplish the aforestated object in a device of optimum simplicity without sacrifice to sturdiness or efficiency. Yet another object is to provide such a device, which is easy of manufacture, low in cost, and readily adaptable to existing tractors.

These and other objects, which will be apparent, are attained by the present invention, a preferred form of which is described in the following specification, as illustrated in the drawings, in which:

FIGURE 1 is a side elevational view of a tractor, mounting the bucket equipment, in position for a backward, or hoeing operation, and showing three working positions of the bucket or shovel;

FIGURE 2 is a view similar to FIGURE 1, showing the bucket unit mounted for forward sweeping movements, or shovelling;

FIGURE 3 is a perspective view of the shovel unit, apart from its supporting framework;

FIGURE 4 is a sectional view, taken on the line 4—4 of FIGURE 3;

FIGURE 5 is a sectional view taken on the line 5—5 of FIGURE 4, and

FIGURE 6 is a perspective view of the scoop portion of the shovel, with a dash-line showing of the open position of the swinging cover.

Referring to the drawings by characters of reference, there is shown, in FIGURES 1 and 2, a conventional tractor 10, having a chassis 12, which is provided, on each side, with a bracket 14, each having a pin 16, pivoting an arm 18 of the swinging yoke, which carries the bucket assembly 20 at its outer end. Each arm or rod 18, has a bracket 22 near its pivoted end, pivotally carrying the piston rod 24 of a hydraulic cylinder 26, pivoted on a bracket 28 depending from the vehicle chassis. By this means the arms 18 are swung about the pivot 16, to position the bucket assembly 20 as required.

Midway of their length, the yoke arms 18 have upstanding brackets 30, carrying a cross shaft 32, on which is pivotally mounted a hydraulic cylinder 34, the piston rod 36 of which is pivoted to the bucket assembly 20 in a manner to be presently described. Suitable hydraulic lines, shown at 38, lead to controls located on the tractor.

Referring to FIGURE 3, the bucket unit is seen as comprising a pair of spaced, side rails 40, of rectangular, tubular construction, to the lower ends of which is secured as by welding, the bucket proper, having a flat bottom plate 42, integral with a pair of upturned, rectangularly disposed side plates 44, the inner edges of which are welded to the side rails 40. As seen in FIGURE 4, the side plates 44 are in the general form of skewed parallelograms, so as to give an efficient bite angle to the bucket, or shovel. The back wall plate cover 46 of the shovel is secured by a pair of hinges 48, at its top, so as to be swingable to open position to permit dumping of the contents of the shovel. The cover is locked in closed position by a latch 50, pivoted on a pin 52 in one of the side rails 40, biased to locking position by a tension, coil spring 54, which is overcome, to unlock the back plate cover, by pull on a cable 56, passing up and out of the side rail, through an opening 58, and leading to the control zone in the tractor.

Teeth 60 of the shovel are contained in inverted channels 60, welded to bottom plate 42, and are secured in place by screws 62, so as to be removable for replacement, sharpening, or repair.

For suspending the bucket unit in its main support on yoke arms 18, the bucket rails 40 have a sturdy cross piece 64, of channel section, welded to the rails, and extending on each side of the pair of rails. A pair of rods 66, laid over the cross bar 64, and welded at their ends to rails 40, not only serve as additional holding means for the cross bar, but also strengthen the rails 40 against bending stresses. At each outer end, the cross bar 64 has a transverse plate 68 with bores 70, 72 near each respective end. Inwardly of each plate 68, a pair of plates 74, 76 are welded to cross bar 64 on opposite sides thereof, in spaced relation to plate 68, and have bores axially aligned with bores 70 and 72. For use as a shovel, the outer ends of yoke arms 18 are secured by pivot pins 78 engaged in holes 70 and their aligned holes in plates 74, and for use as a hoe, the yoke end pins are carried in the bores on the axis of bores 72 in plates 68, the bucket unit being turned about for the conversion, as shown in FIGURES 1 and 2.

The bucket unit is swingable about the axis of pins 78, carried by the yoke, by means of piston rod 36, the latter being pivoted on a pin 80, carried by bores 82, in the inner faces of a pair of U brackets 84, secured as by welding to the inside faces of rails 40 of the bucket unit, at their upper ends.

While a certain preferred embodiment has been shown and described, modifications will be apparent, in the light of this disclosure, and the invention should not, therefore, be deemed as limited, except insofar as shall appear from the spirit and scope of the appended claims.

What is claimed is:

1. For use with a swinging frame on a tractor, an earthworking shovel unit, adapted for alternative use as a hoe, comprising a pair of spaced, parallel, tubular members of rectangular cross section, a bucket comprising a bottom plate secured to the ends of said members, and a pair of side plates, extending from one side of said members, said bottom plate arranged at a small, acute angle to the plane of said members, a back plate cover hinged to said members, and adapted to close the rear side of said bucket, spring latch means for holding said cover closed, a series of inverted channels secured on the inner face of said bottom plate, a bar with tapered outer end secured in each said channel, a cross bar secured to said members, above said bucket, and with its ends extending outwardly of said members, a rod with its ends secured to each said member and folded over said cross bar, a perpendicularly disposed plate secured medially of its length to each end of said cross bar, and having bores on opposite sides of said cross bar, a pair of aligned plates secured to and extending on opposite sides of said cross bar inwardly of each of the first-mentioned plates, and having bores axially aligned with the first-mentioned bores, said bores providing alternative journals for pivoting the unit to a powered device for swinging the unit, and a journal for a fulcrum pivot, comprising a pair of channel-form elements, secured to inner faces of said members, outwardly of said cross bar, with their bottoms disposed inwardly of the members, in opposed relation, and having bores to receive a pivot pin.

2. For use with a swinging frame on a tractor, an earthworking shovel unit, adapted for alternative use as a hoe, comprising a pair of spaced, parallel, members, a bucket comprising a bottom plate secured to the ends of said members, and a pair of side plates, extending from one side of said members, a back plate cover hinged to said members, and adapted to close the rear side of said bucket, spring latch means for holding said cover closed, a series of inverted channels secured on the inner face of said bottom plate, a bar with tapered outer end secured in each said channel, a cross bar secured to said members, above said bucket, and with its ends extending outwardly of said members, a rod with its ends secured to each said member and folded over said cross bar, a perpendicularly disposed plate secured medially of its length to each end of said cross bar, and having bores on opposite sides of said cross bar, a pair of aligned plates secured to and extending on opposite sides of said cross bar inwardly of each of the first-mentioned plates, and having bores axially aligned with the first-mentioned bores, said bores providing alternative journals for pivoting the unit to a powered device for swinging the unit, and a journal for a fulcrum pivot, comprising a pair of channel-form elements, secured to inner faces of said members, outwardly of said cross bar with their bottoms disposed inwardly of the members, in opposed relation, and having bores to receive a pivot pin.

3. For use with a swinging frame on a tractor, an earthworking shovel unit, adapted for alternative use as a hoe, comprising a pair of spaced, parallel members, a bucket comprising a bottom plate secured to the ends of said members, and a pair of side plates, extending from one side of said members, a back plate cover hinged to said members, and adapted to close the rear side of said bucket, spring latch means for holding said cover closed, a series of inverted channels secured on the inner face of said bottom plate, a bar with tapered outer end secured in each said channel, a cross bar secured to said members, above said bucket, and with its ends extending outwardly of said members, a rod with its ends secured to each said member and folded over said cross bar, a perpendicularly disposed plate secured medially of its length to each end of said cross bar, and having bores on opposite sides of said cross bar, a pair of aligned plates secured to and extending on opposite sides of said cross bar inwardly of each of the first-mentioned plates, and having bores axially aligned with the first-mentioned bores, said bores providing alternative journals for pivoting the unit to a powered device for swinging the unit, and journal means on said members, outwardly of said cross bar, adapted to pivotally mount an adjustable fulcrum unit.

4. For use with a swinging frame on a tractor, an earthworking shovel unit, adapted for alternative use as a hoe, comprising a pair of spaced, parallel members, a bucket comprising a bottom plate secured to the ends of said members, and a pair of side plates, extending from one side of said members, a back plate cover hinged to said members, and adapted to close the rear side of said bucket, spring latch means for holding said cover closed, a series of inverted channels secured on the inner face of said bottom plate, a bar with tapered outer end secured in each said channel, a cross bar secured to said members, above said bucket, and with its ends extending outwardly of said members a perpendicularly disposed plate secured medially of its length to each end of said cross bar, and having bores on opposite sides of said cross bar, a pair of aligned plates secured to and extending on opposite sides of said cross bar inwardly of each of the first-mentioned plates, and having bores axially aligned with the first-mentioned bores, said bores providing alternative journals for pivoting the unit to a powered device for swinging the unit, and journal means on said members, outwardly of said cross bar, adapted to pivotally mount an adjustable fulcrum unit.

5. For use with a swinging frame on a tractor, an earthworking shovel unit, adapted for alternative use as a hoe, comprising a pair of spaced, parallel members, a bucket comprising a bottom plate secured to the ends of said members, and a pair of side plates, extending from one side of said members, a back plate cover hinged to said members, and adapted to close the rear side of said bucket, spring latch means for holding said cover closed, a series of teeth secured on the inner face of said bottom plate, a cross bar secured to said members, above said bucket, and with its ends extending outwardly of said members, a perpendicularly disposed plate secured medially of its length to each end of said cross bar, and having bores on opposite sides of said cross bar, a pair of aligned plates secured to and extending on opposite sides of said cross bar inwardly of each of the first-mentioned plates, and having bores axially aligned with the first-mentioned bores, said bores providing alternative journals for pivoting the unit to a powered device for swinging the unit, and journal means on said members, outwardly of said cross bar, adapted to pivotally mount an adjustable fulcrum unit.

6. For use with a swinging frame on a tractor, an earthworking shovel unit, adapted for alternative use as a hoe, comprising a pair of spaced, parallel members, a bucket comprising a bottom plate secured to the ends of said members, and a pair of side plates, extending from one side of said members, a back plate cover hinged to said members, and adapted to close the rear side of said bucket, spring latch means for holding said cover closed, a series of teeth secured on the inner face of said bottom plate, a cross bar secured to said members, above said bucket, and with its ends extending outwardly of said members and journal means on opposite sides of said cross bar, outwardly of said members, providing alternative journals for pivoting the unit to a powered device for swinging the unit, and journal means on said members, outwardly of said cross bar, adapted to pivotally mount an adjustable fulcrum unit.

References Cited in the file of this patent

UNITED STATES PATENTS

| 665,685 | Hetlesaeter | Jan. 8, 1901 |
| 1,034,237 | Hill | July 30, 1912 |
| 2,612,280 | Stueland | Sept. 30, 1952 |
| 2,815,137 | Johnson | Dec. 3, 1957 |

FOREIGN PATENTS

| 1,157,133 | France | Dec. 23, 1957 |